United States Patent
Saunders

Patent Number: 5,262,778
Date of Patent: Nov. 16, 1993

[54] THREE-DIMENSIONAL DATA ACQUISITION ON A TWO-DIMENSIONAL INPUT DEVICE

[75] Inventor: Steven E. Saunders, Cupertino, Calif.

[73] Assignee: Apple Computer, Inc., Cupertino, Calif.

[21] Appl. No.: 811,170

[22] Filed: Dec. 19, 1991

[51] Int. Cl.⁵ .............................................. G08C 21/00
[52] U.S. Cl. ...................................... 341/34; 341/20; 178/18
[58] Field of Search ..................... 341/20, 34; 178/18, 178/20; 340/712

[56] References Cited

U.S. PATENT DOCUMENTS

| | | | |
|---|---|---|---|
| 4,687,885 | 8/1987 | Talmage, Jr. et al. | 178/18 |
| 4,897,511 | 1/1990 | Itaya et al. | 178/18 |
| 4,983,786 | 1/1991 | Stevens et al. | 178/18 |

OTHER PUBLICATIONS

Herot et al; "One Point Touch Input of Vector Information For Computer Displays"; Computer Graphics; vol. 12, No. 3; Aug. 1978; pp. 275-281.

*Primary Examiner*—Donald J. Yusko
*Assistant Examiner*—Michael Horabik
*Attorney, Agent, or Firm*—Blakely, Sokoloff, Taylor & Zafman

[57] ABSTRACT

A method and apparatus for providing signals indicative of X, Y, and Z parameter values onto a computer controlled display system having a computer and a display. A user activated input device is provided for sensing an input signal with an X value, a Y value and a Z value in the display system. The input device includes (i) a first electrically conductive sheet having a first terminal and a second terminal, (ii) a second electrically conductive sheet having a third terminal and a fourth terminal, and (iii) a separator separating the first conductive sheet and the second conductive sheet. The input signal is provided by applying a pressure at a location on the first conductive sheet of the input device. The first sheet contacts the second sheet at the location. The location on the first conductive sheet corresponds to the X position and the Y position of the input signal to the display system. The pressure at the location corresponds to the Z value of the input signal to the display system. A predetermined current (I) is applied at the first terminal of the first sheet and a ground at the third terminal of the second sheet. The X position, the Y position, and the Z values are measured by measuring a first voltage ($V_1$) at the first terminal of the first sheet, a second voltage ($V_2$) at the second terminal of the first sheet, and a third voltage ($V_3$) at the fourth terminal of the second sheet, wherein the X, Y, and Z values can be obtained from the following equations:

$$X = \frac{V_2}{V_1}, Y = \frac{V_3}{V_1}, Z = \frac{(V_2 - V_3)}{I}.$$

15 Claims, 5 Drawing Sheets

THREE-DIMENSIONAL DATA ACQUISITION ON A TWO-DIMENSIONAL INPUT DEVICE

FIELD OF THE INVENTION

The present invention pertains to the field of computer input systems. More particularly, this invention relates to a technique for acquiring three-dimensional data input on a two-dimensional touch/press input device of a computer system.

BACKGROUND OF THE INVENTION

In a computer system having a display device, the interactive operation of the system by a user is typically based on visual feedback from displayed information on the display. For example, a user may be required to repetitively choose software options displayed on the display, or may desire to input data in graphics format (e.g., drawing images on the display) into the computer system.

The advances in computer interface technologies have led to the use of control signal generating devices as interface devices to effect such interactive operation. The devices control the position and movement of a cursor or a pointer on the screen of a computer controlled display. The control signals generated by these devices include coordinate signals for a selected position of the cursor on the display. The coordinate signals are used to drive display circuits of the display device to control the movement of the cursor from its current position in the display to the selected position.

One prior type of such control signal generating device is commonly referred to as a "mouse." One example of the mouse is described in U.S. Pat. No. 4,464,652, issued in August 1984. The mouse is often used to control the position of a cursor on the computer's display screen to thereby position the cursor over an object to select the object for an action or otherwise to instruct the computer to perform an operation. Another prior type of such control signal generating device is commonly referred to as "joystick."

While the use of these devices for such interactive operation is very effective and very "user friendly," it has been found that disadvantages are associated with such prior types of devices.

One prior disadvantage associated is that when using each of these devices, the entire hand has to be used to operate these devices. The user must stop his or her hand operation on a keyboard or other type of input devices and move his or her hand from the keyboard to grasp the mouse or joystick. It sometimes also requires that the user's eyes be shifted from the display to aid in the grasping of the device. In many applications (e.g., word processing), the operation of such device results in a substantial loss in convenience and efficiency due to the diversion of the user's attention from the display.

Another prior disadvantage associated with these devices is that when a user wishes to place the cursor at a desired spot on the display, the user has to operate the control signal generating device in order to move the cursor from its present position to the desired position on the display. Therefore, the device provides a less natural, non-coincident input path for the user.

One prior approach to solving these problems is to develop a control signal generating device that can be activated by a finger press or finger touch. One example of such device is described in U.S. Pat. No. 4,692,756, issued on Sep. 8, 1987. This prior signal generating device includes a plane window area in which an actuating knob is located. The knob can be moved by a finger within the window area. The movement of the knob within the window area results in the production of coordinate control signals which represent the coordinates of the position of the knob. The control signals are then used to determine the position of the cursor on the display.

Another prior approach to overcoming these problems is to develop a press/touch sensitive control signal generating device. The device is typically mounted on the frame of the display screen. The user's finger touch/press at a spot on the device causes the device to produce control signals representing the position of the finger touch/press spot. The control signals are thus used to determine the selected position of the cursor on the display and place the cursor onto the selected position on the display. The touch/press sensitive device provides more natural and coincident input path to the computer.

One disadvantage of the finger/press touch type of prior devices is that these devices were designed to allow the user to move the cursor on the display in two-dimensional representation. The technological developments in computer graphics, however, have made it possible for objects to be displayed in three-dimensional representation, for example in wireframe, solid and/or shaded forms on the display. Therefore, it is desirable to develop a touch/press type of control signal generating device that allows three-dimensional control signal input.

One prior solution is described by C. F. Herot, et al. in an article entitled "One-Point Touch Input of Vector Information for Computer Displays," Computer Graphics, Vol. 12, No. 3, August 1978. In that article, a three-dimensional pressure/touch sensitive digitizer is disclosed in which the X-Y input corresponds to the location of a press input on the device, and the Z input corresponds the force normal to the device. The device includes a sheet of clear glass mounted on two adjacent edges. The device is secured to a screen of the display by means of four octagonal rings. The device also employs eight semiconductor strain gauges, with two secured on a mounting ring. All forces exerted on the device are transmitted to the rings, thus causing deformations which in turn flex the strain gauges secured to them.

One disadvantage of this three-dimensional pressure/touch device is that the thickness, and hence flexibility of these rings is critical to the sensitivity of the gauges' measurements. Because the rings are designed to accommodate subtle pressures, high finger pressures cannot be precisely measured. Moreover, a vibration from a nearby source may trigger the gauges, thus resulting in a false input.

SUMMARY AND OBJECTS OF THE INVENTION

One of the objects of the present invention is to provide a technique for obtaining three dimensional parameter information on a two-dimensional input device.

Another object of the present invention is to provide a technique for obtaining three-dimensional parameter information on a pressure activated two-dimensional and substantially planar input device.

A method and apparatus are described for providing signals indicative of X and Y positions, and Z value onto a computer controlled display system having a computer and a display. A user activated input device is provided for sensing an input signal with an X position, a Y position, and a Z value in the display system. The Z value may be one of any possible types of parameters; for example, the Z value may represent the Z position in 3-D space or may represent the line width or shading darkness or color of a 2-dimensional line at the X and Y positions on the display screen. The input device comprises (i) a first electrically conductive sheet having a first terminal and a second terminal, (ii) a second electrically conductive sheet having a third terminal and a fourth terminal, and (iii) a plurality of insulating spacers arranged in an array between the first conductive sheet and the second conductive sheet. The input signal is provided by applying a pressure at a location on the first conductive sheet of the input device. The first sheet contacts the second sheet at the location. The location on the first conductive sheet corresponds to the X position and the Y position of the input signal to the display system. The pressure at the location corresponds to the Z value of the input signal to the display system. A predetermined current (I) is applied at the first terminal of the first sheet and a ground at the third terminal of the second sheet. The X position, the Y position, and the Z value are measured by measuring a first voltage ($V_1$) at the first terminal of the first sheet, a second voltage ($V_2$) at the second terminal of the first sheet, and a third voltage ($V_3$) at the fourth terminal of the second sheet, wherein the X and Y positions, and Z value can be obtained from the following equations:

$$X = \frac{V_2}{V_1}, Y = \frac{V_3}{V_1}, Z = \frac{(V_2 - V_3)}{I}.$$

Other objects, features, and advantages of the present invention will be apparent from the accompanying drawings and from the detailed description that follows below.

BRIEF DESCRIPTION OF THE DRAWINGS

The present invention is illustrated, by way of example and not limitation, in the figures of the accompanying drawings, in which like references indicate similar elements and in which:

FIG. 5 illustrates the circuitry diagram of the pressure sensitive input device of FIGS. 1-4; FIG. 5 shows one prior art embodiment of measuring X position of the finger pressed area;

FIG. 6 illustrates the circuitry diagram of the pressure sensitive input device of FIGS. 1-4; FIG. 6 shows a preferred embodiment of measuring X, Y, and Z values of the finger pressed area.

DETAILED DESCRIPTION OF THE INVENTION

Figure 1:
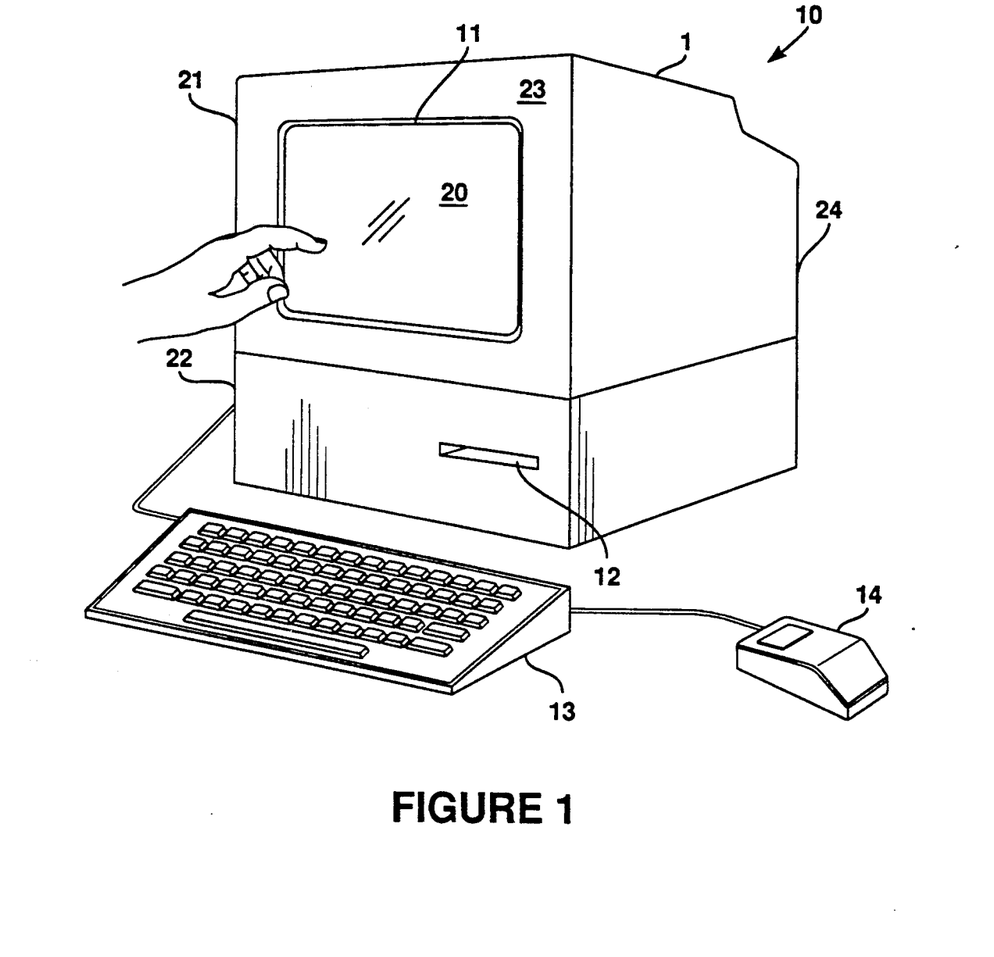
FIG. 1 schematically illustrates a computer system, including a pressure sensitive video display of the computer system.

FIG. 1 illustrates a personal computer 10, which implements a preferred embodiment of the present invention. Computer 10 includes a pressure sensitive video display 11 of the present invention. In one embodiment, computer 10 is a personal computer. In a further embodiment, compute 10 is a laptop computer. In alternative embodiments, computer 10 may be any other types of computers.

Computer 10 includes a main housing 1, as can be seen from FIG. 1. Main housing 1, in the preferred embodiment of the present invention, is made from injection molded plastic material. Inside main housing 1, there are installed all the essential and well known electronic circuitry for the computer's operation, such as CPU, memory, hard and floppy disk drive, input-/output circuitry, display circuitry, and power supply. Such electronic circuitry for a personal computer is well known. One example of such computer is the Macintosh Portable from Apple Computer, Inc. of Cupertino, Calif.

Main housing 1 of computer 10 also accommodates pressure sensitive display 11. Pressure sensitive display 11 contains a display screen 20, on which a pressure sensitive input device, described below, is mounted, making display screen 20 a pressure sensitive touch input display screen. Display screen 20 with its associated circuitry provides displayed information on the screen. Display screen 20 also displays a cursor, which is movable on the screen.

In one embodiment, display 11 includes a cathode ray tube (i.e., CRT) monitor. In another embodiment, display 11 includes a liquid crystal display (i.e., LCD) unit. In alternative embodiments, display 11 may be any other well known display device. As can be seen from FIG. 1, display screen 20 is mounted in a frame 23 at the center of an upper front surface 21 of main housing 1. Display 11 is coupled to the associated circuitry inside main housing 1.

Below frame 23, a slot 12 is shown. Slot 12 is part of the floppy disc drive of computer 10. Slot 12 allows a floppy disc to be inserted into the floppy disc drive. A keyboard 13 is also shown in FIG. 1 which is connected to computer 10. Keyboard 13 provides inputs to computer 10. In one embodiment, keyboard 13 is a conventional "QWERTY" keyboard which includes a large, elongated space bar key in the bottom row of the keyboard. The cursor control device may be any type of cursor control device and may be located at the sides of the keyboard. For example, the cursor control device can be located at the right or left side of the keyboard. As a further example, the cursor control device may be located on top of the keyboard.

Computer 10 may also include a separate mouse 14. Mouse 14 is employed to provide another input path to computer 10. Alternatively, mouse 14 may be replaced with a joystick, a touch tablet, or any other means which provides the equivalent functions.

The pressure sensitive input device overlays display screen 20. In one embodiment, the pressure sensitive input device is secured to frame 23 of main housing 1. In this case, the input device does not contact display screen 20 and is kept a certain distance from screen 20. In another embodiment, the input device is secured to display screen 20. In this case, the pressure sensitive input device is made in the same curved shape as screen 20 in order to firmly contact against the surface of display screen 20. The pressure sensitive input device includes circuitry (not shown in FIG. 1) located inside main housing 1 for receiving and determining the signals generated by the device.

The pressure sensitive input device is a pressure activated input device. The device is used to receive location and pressure parameters of an input by a point press. As can be seen from FIG. 1, when a user's finger presses on the pressure sensitive input device on video display 11, an input is made to computer 10. The pressure sensitive input device offers a natural and coincident means for immediate and multi-dimensional man-machine interaction for computer 10.

When activated by the user's finger press, the pressure sensitive input device generates X, Y, and Z three-dimensional coordinate control signals of the input to computer 10. These control signals are then used in conventional ways to drive the display circuitry for illustrating the position of the input on display screen 20. For example, the control signals can be used to control the positioning of the cursor on display screen 20 in three-dimensional environment, or to control movement of an element of a video game display in a three-dimensional environment where the computer system is capable of displaying images on the computer's display screen in 3-dimensional representation. For the first use, the cursor would be moved to a selected position which is press selected. Alternatively, the control signals can be used to control a graphics input in three-dimensional representation onto display screen 20 in a manner analogous to such control as effected by an electronic "writing tablet." Alternatively, the Z value can be used to control any other attribute such as the color or line width of an object.

By its single finger operation, the pressure sensitive input device is extremely compatible for use with a keyboard interface, because it can be operated with very little movement of the hand from a normal typing position.

Moreover, dislocations of a three-dimensional positional input caused by separate inputs and representation surfaces are circumvented by superimposing the pressure sensitive input device directly over display screen 20.

The pressure sensitive input device will be described in more detail below, in conjunction with FIGS. 2–6.

Figure 2:
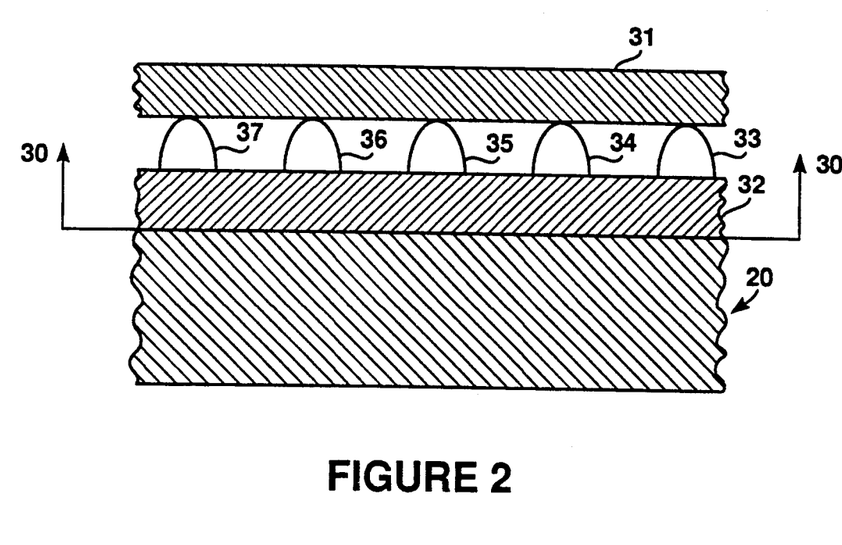
FIG. 2 is a cross sectional view partly showing the pressure sensitive video display, including a pressure sensitive input device having a first conductive sheet, a second conductive sheet, and an array of insulating spacers.

Referring to FIG. 2, a portion of video display 11 is shown. In FIG. 2, the pressure sensitive input device 30 (a portion of the pressure sensitive input device 11) is also shown, which includes a first conductive sheet 31, a second conductive sheet 32, and a plurality of insulating spacers (33, 34, 35, 36 and 37), such as those used by Elographics in its Accutouch product, arranged between first and second conductive sheets 31 and 32. In FIG. 2, only spacers 33 through 37 are shown. The purpose of the spacers is to keep first and second conductive sheets 31 and 32 separate and thus function as a separating means. It should be noted that the use of these insulating spacers is not required for the purpose of this invention, although such spacers are usually necessary when the touchpanel input device is curved, for example when fitted over a CRT display. The spacers of pressure sensitive input device 30, including spacers 33–37, are arranged in an array between first and second conductive sheets 31 and 32. The spacers are in the form of very small dots made of rigid materials, and are of uniform heights. FIG. 2 shows a portion of pressure sensitive input device 11 and the screen 20.

As is seen from FIG. 2, second conductive sheet 32 is in contact with display screen 20. In this case, both first and second conductive sheets 31 and 32 are in curved shape such that pressure sensitive input device 30 can be placed onto display screen 20. However, pressure sensitive input device 30 is not necessarily in contact with display screen 20. For example, pressure sensitive input device 30 can be mounted on frame 23 of main housing 1 (FIG. 1).

First and second conductive sheets 31 and 32 are electrically conductive. The structure of first and second conductive sheets 31 and 32, is described in detail below, in conjunction with FIGS. 3–6.

As also can be seen from FIG. 2, first and second conductive sheets 31 and 32 are maintained spaced apart by the array of the insulating spacers, including spacers 33–37. FIG. 2 illustrates one preferred embodiment of the present invention. In other preferred embodiments, other separating means may be employed. For example, an anisotropic high resistive material can be used to fill the gap between sheets 31 and 32 to substantially electrically insulate the two sheets. The anisotropic material has a large resistance which declines slowly and gradually under pressure. In this case, when first sheet 31 is pressed against second sheet 32 at one spot, the pressure resistance of the anisotropic material caused by the finger pressure at the spot is much greater than noise resistance or errors in measurement. Thus a much more accurate measurement of the pressure resistance can be obtained. As a further example, the anisotropic high resistive material can be used along with the insulating spacers to fill the gap between sheets 31 and 32. Another example of a separating means, a mounting means may be used to mount the top conductive sheet under tension to keep it apart from the other conductive sheet.

Figure 3:
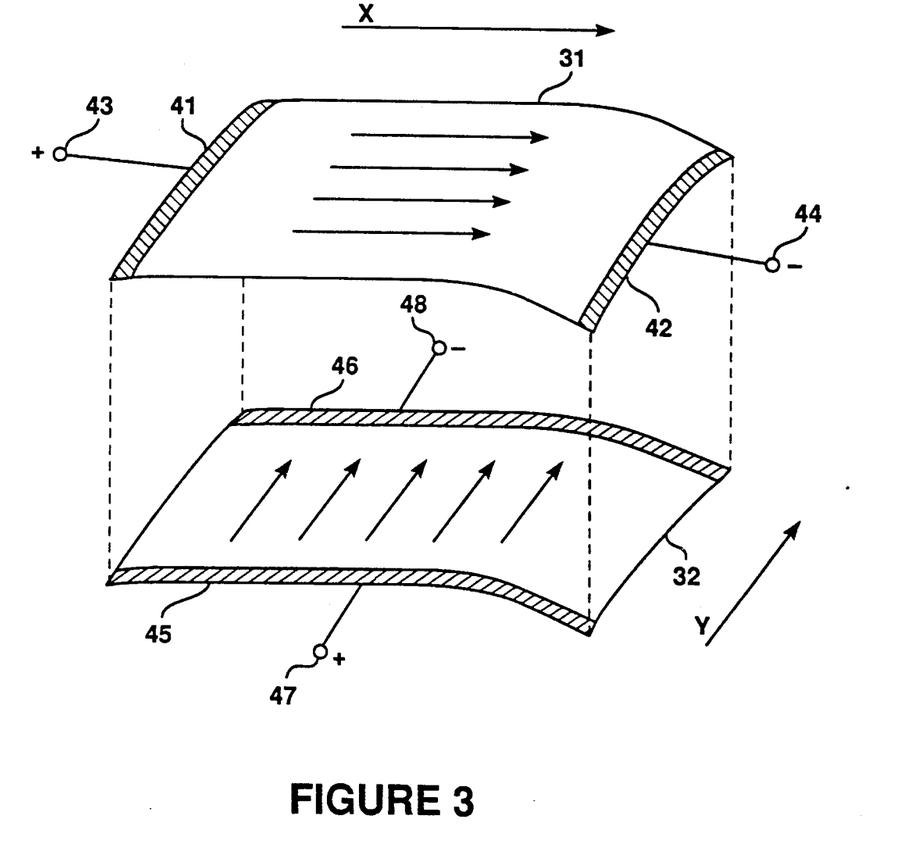
FIG. 3 illustrates the first and second conductive sheets in uncoupled position.

FIG. 3 illustrates first conductive sheet 31 and second conductive sheet 32 of device 30 in uncoupled position. In FIG. 3, insulating spacers of pressure sensitive input device 30 are not shown in order to facilitate the description of the first and second conductive sheets 31 and 32.

In FIG. 3, first conductive sheet 31 includes an electrical contact bar 41 at its left end, and an electrical contact bar 42 at its right end. Both electrical contact bars 41 and 42 are of little resistance compared to the resistance of the sheet, and are used for connecting first conductive sheet 31 to a first terminal 43 and a second terminal 44, respectively.

Likewise, second conductive sheet 32 includes an electrical contact bar 45 at its bottom side, and an electrical contact bar 46 at its top side. Both electrical contact bars 45 and 46 are of little resistance compared to the resistance of the sheet, and are used for connecting second conductive sheet 32 to a third terminal 47 and a fourth terminal 48, respectively.

First conductive sheet 31 is an elastic sheet and second conductive sheet 32 is a rigid sheet. In one embodiment, both sheets 31 and 32 are transparent such that the user's view of display screen 20 (FIG. 1) is not obstructed. However, it is not critical that sheets 31 and 32 be transparent. In alternative embodiments, colored conductive sheets may be provided for sheets 31 and 32.

In the presently preferred embodiment, first conductive sheet 31 is made of elastic plastic material with an indium tin oxide conductive coating layer. The conductivity and resistance of the sheet is provided by the coating layer. Second conductive sheet 32 is a glass plate or made from other type of hard plastic material. Second conductive sheet 32 is also coated with an indium tin oxide conductive layer. The conductive layer on second sheet 32 also causes second sheet 32 to be electrically conductive and have resistance.

The coating layers on first and second conductive sheets 31 and 32 face each other. In this way, when first conductive sheet 31 is pressed to contact second conductive sheet 32, the two layers contact each other.

Both first and second conductive sheets 31 and 32 serve as resistors when currents flow through them. Both first and second sheets 31 and 32 have known resistance on their layers. As can been seen from FIG. 3, when a voltage is applied between terminals 43 and 44, a current flows on the coating layer of sheet 31 in a direction from contact bar 41 to contact bar 42. This direction is defined as X direction.

Similarly, when a voltage is applied to sheet 32 between terminals 47 and 48, a current flows on the coating layer of sheet 32 in a direction from contact bar 45 to contact bar 46. This direction is defined as Y direction which is perpendicular to the X direction.

One example of the sheets 31 and 32 shown and described in FIGS. 1-3 is an ACCUTOUCH product from Elographics, Inc. of California.

Figure 4:
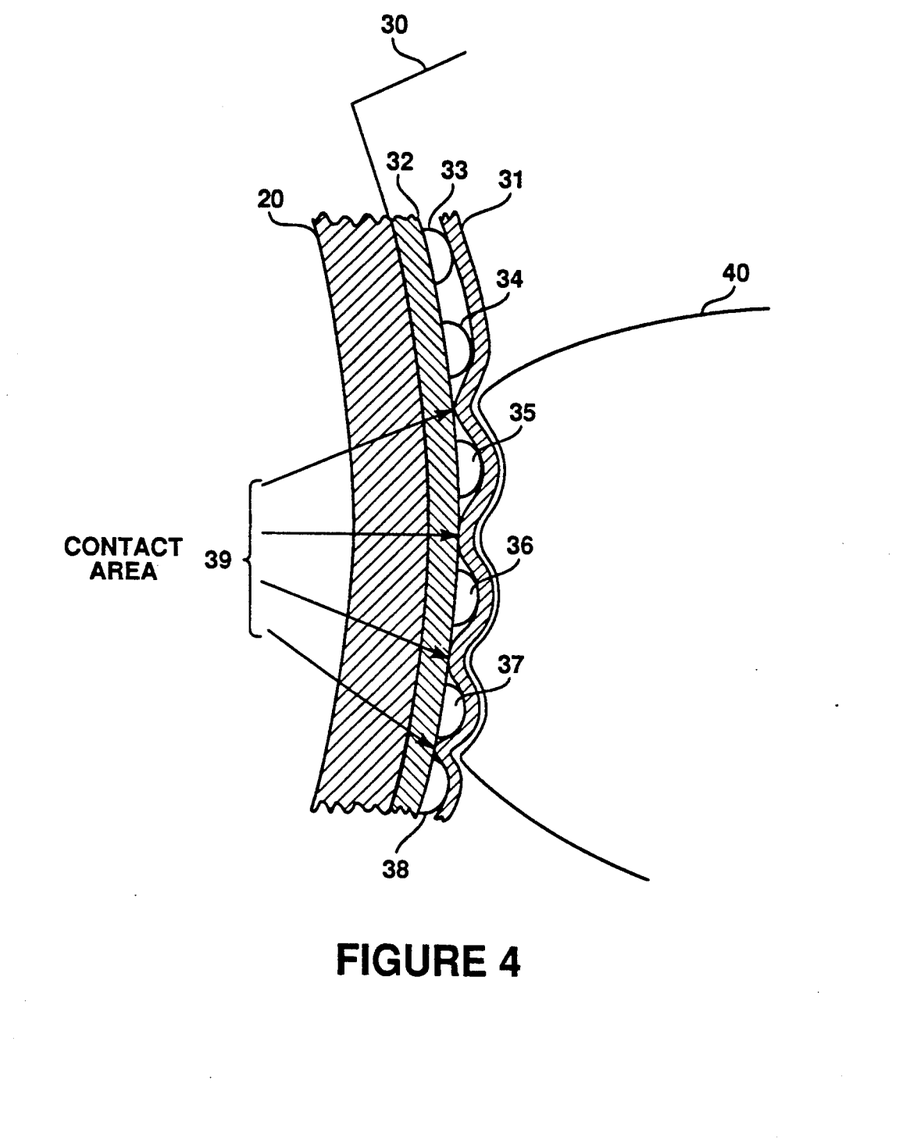
FIG. 4 is a cross sectional view showing the finger pressed area of the pressure sensitive input device, noting that the first conductive sheet contacts the second conductive sheet at the finger pressed area.

FIG. 4 is an enlarged view showing the finger pressed portion of pressure sensitive input device 30. As is illustrated in FIG. 4, a finger 40 touches first conductive sheet 31 with pressure. Given that first conductive sheet 31 is of elastic nature, it is pressed against second conductive sheet at the finger press location, making electrical connection between sheets 31 and 32. As can be seen from FIG. 4, spacers 35-37 are surrounded by the contact area 39 of first and second sheets 31 and 32. This is because the insulating spacers are made of rigid materials, and are employed to separate first and second sheets 31 and 32 when there is no pressure on first sheet 31. In addition, since the insulation spacers of device 30 are in array arrangement, the contact area 39 is connected together. The size of the contact area 39 of the two sheets depends on the finger pressure. If finger 40 presses hard against first sheet 31, a higher pressure is received on first sheet 31, thus causing the contact area 39 to be larger. As described above, the spacers are in the form of very small dots. Therefore, contact area 39 can be regarded as a single contact point between sheets 31 and 32.

Figure 5:
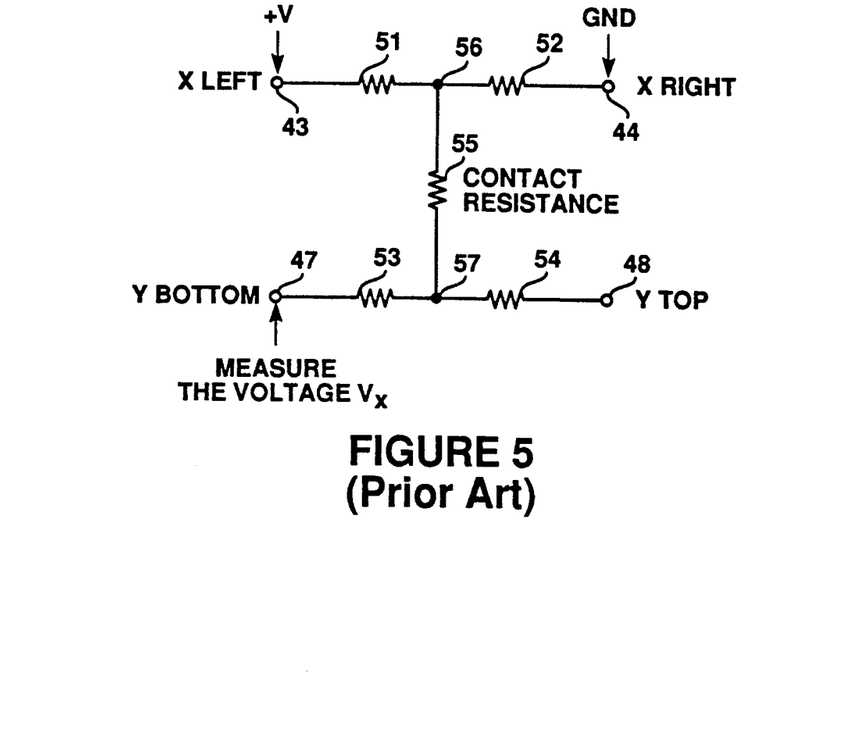
Figure 6:
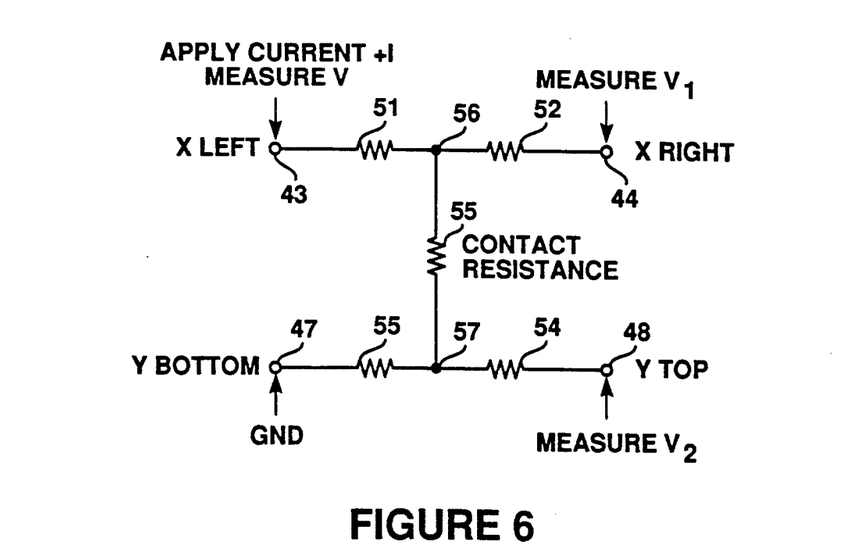

FIGS. 5 and 6 illustrate in circuitry diagram form the equivalent circuit of pressure sensitive input device 30 shown and described above in connection with FIGS. 1-4. In FIGS. 5 and 6, resistors 51 and 52 represent the total resistance of first conductive sheet 31. Resistors 53 and 54 represent the total resistance of second conductive sheet 32. Node 56 represents the contact point of first sheet 31 with second sheet 32. Node 57 represents the contact point of second sheet 32 with first sheet 31. Resistor 55 represents the contact resistance between first and second sheets 31 and 32 at the contact point. The values of resistors 51-54 vary depending on the position of contact nodes 56 and 57. For example, as can be seen from FIGS. 1 and 3, if the user's finger press is made on first sheet 31 at a location close to first terminal 43 at the left side, resistor 51 assumes a resistance value less than that of resistor 52. If the user's finger press is made on sheet 31 at a location close to second terminal 44 at right side, resistor 51 assumes a resistance value greater than that of resistor 52. The resistance value of resistor 51 is in proportion to the distance between the first terminal 43 at the left side of sheet 31 to the location of the user's finger press (i.e., node 56). The resistance value of resistor 52 is in proportion to the distance between node 56 to the second terminal 44 at the right side of sheet 31.

Similarly, the resistance value of resistor 53 is in proportion to the distance between the third terminal 47 on the bottom side of sheet 32 to the location of the user's finger press (i.e., node 57) and the resistance value of resistor 54 is in proportion to the distance between node 57 to the fourth terminal 48 at the top side of sheet 32. If the location of the user's finger press is close to the bottom side of sheet 32, resistor 53 assumes a resistance value less than that of resistor 54. If the location of the user's finger press is close to the top side of sheet 32, resistor 53 has a resistance value greater than that of resistor 54.

Resistor 55 assumes the contact resistance of the contact area 39 between sheets 31 and 32 at the location of the user's finger press (FIG. 4). The resistance value of resistor 55 depends on the size of the contact area 39 at the location of the finger press, thus depending on the pressure of the finger press. If the pressure the finger press provides is greater, the contact area 39 it causes is larger which results in a smaller contact resistance for resistor 55. In embodiments in which the anisotropic material is employed to fill in between first and second conductive sheets 31 and 32, the contact resistance is the resistance of the material under pressure.

FIG. 5 illustrates a prior art method for measuring the X-Y position of the contact area 39 on pressure sensitive input device 30. FIG. 5 illustrates the method of measuring the X position of contact area 39.

In FIG. 5, a voltage V with a known potential is applied to first terminal 43 and a ground GND is applied to second terminal 44. Terminals 47 and 48 are left open. Alternatively, the voltage V can be applied to terminal 44 and the ground can be applied to terminal 43. In this case the measurement remains the same. One terminal of a potential (voltage) measurement circuit is coupled to one of either of terminals 47 and 48 for measuring a voltage $V_x$ at the terminal, and the other terminal of the potential measurement circuit is coupled to ground. For example, the measurement circuit may be coupled to terminal 47, as illustrated in FIG. 5. The potential measurement circuit is well known in the art. For example, a voltmeter can be employed to measure the $V_x$.

Because all potential measurement circuitry has an input impedance equivalent to an open circuit in order not to affect the circuit it measures, the voltage $V_x$ measured at terminal 47 is the voltage of node 56 (note that there is no voltage drop across Resistors 53 and 55 (no current flows through them) when measuring $V_x$ at 47, therefore $V_x$ at terminal 47 shows the voltage drop across resistor 52). It will be appreciated that a potential measurement circuit (a typical voltage measuring means) as used in the invention should have a high input impedance. Therefore, the X position (measured relative to the grounded terminal of the sheet 31) of the contact area 39 can be determined as follows:

$$X = \frac{V_x}{V} \qquad (1)$$

The Y position of the contact area 39 is determined by a similar procedure. Again referring to FIG. 5, the voltage V is first applied to either of terminals 47 and 48 and the ground GND is applied to the other one of terminals 47 and 48. Assume in this case the voltage V is applied to terminal 47 and the ground GND is applied to terminal 48, a voltage $V_Y$ at node 57 can be measured by connecting one terminal of the potential measurement circuit to either terminal 43 or terminal 44 (and the other terminal of the potential measurement circuit is coupled to ground). Therefore, the Y position (measured relative to the grounded terminal of the sheet 32) of the contact area 39 can be determined as follows:

$$Y = \frac{V_Y}{V} \quad (2)$$

FIG. 6 illustrates one embodiment of measuring of the X, Y, and Z positions of the contact area 39 according to the present invention. In FIG. 6, the X, Y, and Z values are determined in one measurement operation. However, it is also conceivable that the X, Y, and Z values are determined by separate measurements.

In FIG. 6, a known (predetermined) current I is applied to a terminal of one of sheets 31 and 32 and the ground GND is applied to a terminal of the other one of sheets 31 and 32. FIG. 6 illustrates one embodiment in which the current I is applied to terminal 43 and the ground GND is applied to terminal 47. However, it is also conceivable that the current I can be applied to any other three terminals 44, 47, and 48. Likewise the ground GND can be applied to any other three terminals 43, 44, and 48, as long as the current I and the ground GND do not apply to the terminals of the same sheet at the same time. Typically, the current I is applied to one terminal of one sheet, and ground is applied to an adjacent terminal for the other sheet.

When the current I is applied to terminal 43 and the ground GND is applied to terminal 47, terminals 44 and 48 are left open. At this time, measurements are made at terminals 43, 44, and 48 to determine voltages at these terminals. The measurements are made by prior art potential measurement circuits. For example, voltage meters (with high input impedance) may be used to measure the voltages. The voltage measured at terminal 43 is V, the voltage measured at terminal 44 is $V_1$, and the voltage measured at terminal 48 is $V_2$.

In one embodiment, the measurements are made in one measuring operation by, for example, several measuring means. In alternative embodiments, the measurements may be obtained in several separate measurements. For example, the measurements may be made in three separate measuring operations.

As can be seen from FIG. 6, the voltage $V_1$ is the voltage of node 56, and the $V_2$ voltage is the voltage of node 57. In this way, the X, Y, and Z value of the contact area 39 can be determined as follows:

$$X = \frac{V_1}{V} \quad (3)$$

$$Y = \frac{V_2}{V} \quad (4)$$

$$Z = \frac{V_1 = V_2}{I} \quad (5)$$

The X, Y and Z values determined in accordance with FIG. 6 and equations (3), (4), and (5) are relative to certain reference points. For example, it will be appreciated that the X measurement ($V_1/V$) is relative to the terminal 44 (such that if the finger press location is closer to the edge connected to terminal 44, then the X value will be smaller than an X value resulting from a finger press closer to terminal 43). Similarly, it will be appreciated that the Y measurement ($V_2/V$) is relative to the terminal 47 (such that if the finger press location is closer to the edge connected to terminal 47, the Y value will be smaller than a Y value resulting from a finger press closer to terminal 48). It will also be observed that a harder press will produce a smaller Z value than a softer press. Those in the art will appreciate properly considering the location of these reference points in providing the X, Y and Z values as the inputs to a computer system. It will be appreciated that the X and Y values are typically position values corresponding to the location of the press.

To more accurately determine the X, Y, and Z values in a particular embodiment, the measurement may be repeated with the current I being applied to the three other terminals and corresponding changes to the terminals which receive the ground connection and which have voltages measured. Then the three additional measurements (3 sets of X, Y and Z) are averaged with the original X, Y, and Z measurements of FIG. 6 to provide a final result. In this manner the four measurements of X, Y, and Z (four sets of X, Y and Z) will, by averaging, provide a more accurate input value for X, Y and Z. The table below presents the connections to the 4 different terminals and shows the calculations required to obtain X, Y and Z (relative to the same reference points of FIG. 6) for the corresponding set of connections.

TABLE 1

| GND | I and V | $V_1$ | $V_2$ | X | Y | Z |
|---|---|---|---|---|---|---|
| 48 | 44 | 43 | 47 | $1 - \frac{V_1}{V}$ | $1 - \frac{V_2}{V}$ | $\frac{V_1 - V_2}{I}$ |
| 44 | 48 | 47 | 43 | $\frac{V_2}{V}$ | $\frac{V_1}{V}$ | $\frac{V_1 - V_2}{I}$ |
| 43 | 47 | 48 | 44 | $1 - \frac{V_2}{V}$ | $1 - \frac{V_1}{V}$ | $\frac{V_1 - V_2}{I}$ |

It will be appreciated that the processing means of the computer system, or dedicated processing means, can calculate the X, Y and Z values from the various voltages measured according to the present invention.

In this way, the Z value parameter is obtained through the measurement in addition to the X and Y position parameters.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for providing signals indicative of X, Y, and Z parameter values onto a computer controlled display system having a computer and a display comprising the steps of:

(A) providing a user activated input means for sensing an input signal with an X parameter, a Y parameter, and a Z parameter, wherein the input means comprises (i) a first electrically conductive sheet having a first terminal and a second terminal, (ii) a second electrically conductive sheet having a third terminal and a fourth terminal, and (iii) a means for separating the first conductive sheet and the second conductive sheet;

(B) providing the input signal by applying a pressure at a location on the first conductive sheet of the input means, wherein the first sheet contacts the second sheet at the location, wherein the location on the first conductive sheet corresponds to the X parameter value and the location on the second conductive sheet corresponds to the Y parameter value of the input signal to the display system, wherein the pressure at the location corresponds to the Z parameter value of the input signal to the display system;

(C) applying a predetermined current (I) at the first terminal of the first sheet and a ground at the third terminal of the second sheet;

(D) measuring a first voltage ($V_1$) at the first terminal of the first sheet, a second voltage ($V_2$) at the second terminal of the first sheet, and a third voltage ($V_3$) at the fourth terminal of the second sheet; and (E) deriving the values of the X parameter, the Y parameter, and the Z parameter as respective functions of the first voltage ($V_1$), the second voltage ($V_2$), the third voltage ($V_3$), and the current (I).

2. The method of claim 1, wherein the X, Y, and Z parameter values are obtained from the following equations:

$$X = \frac{V_2}{V_1}, Y = \frac{V_3}{V_1}, Z = \frac{(V_2 - V_3)}{I}.$$

3. The method of claim 1, wherein the second sheet of the input means is rigid and the first sheet of the input means is elastic and wherein the input means is mounted in front of the display.

4. The method of claim 1, wherein the step (D) measures the first voltage $V_1$, the second voltage $V_2$ and the third voltage $V_3$ in one operation.

5. The method of claim 1 wherein said display displays images in three dimensional representation and wherein said X, Y and Z parameter values are for X, Y and Z positions in the three dimensional representation.

6. In a computer system having a computer controlled display and a user activated input means, wherein the user activated input means includes a first conductive sheet having a first terminal and a second terminal, a second conductive sheet having a third terminal and a fourth terminal, and a separating means to separate the first conductive sheet and the second conductive sheet, wherein the input means senses an input with an X parameter information, a Y parameter information, and a Z parameter information when a pressure is applied on a location of the first conductive sheet of the input means, wherein the first sheet contacts the second sheet at the location, wherein the location on the first conductive sheet corresponds to the X parameter information and the location on the second conductive sheet corresponds to the Y parameter information of the input to the display system, and wherein the pressure at the location corresponds to the Z parameter information of the input to the display system, a method of measuring the X parameter information, the Y parameter information, and the Z parameter information of the location on the input means, compromising the steps of:

(a) applying a predetermined current (I) at the first terminal of the first sheet and a ground at the third terminal of the second sheet of the input means;

(b) measuring a first voltage ($V_1$) at the first terminal of the first sheet, a second voltage ($V_2$) at the second terminal of the first sheet, and a third voltage ($V_3$) at the fourth terminal of the second sheet; and (c) deriving the values of the X parameter, Y parameter, and Z parameter, as respective functions of the first voltage ($V_1$), the second voltage ($V_2$), the third voltage ($V_3$), and the current (I).

7. The method of claim 6, wherein the step (b) measures the first voltage $V_1$, the second voltage $V_2$, and the third voltage $V_3$ in one operation and wherein the X, Y, and Z parameter information are obtained from the equations:

$$X = \frac{V_2}{V_1}, Y = \frac{V_3}{V_1}, Z = \frac{(V_2 - V_3)}{I}.$$

8. The method of claim 6 wherein said computer controlled display is for displaying in three dimensional representation and wherein said X, Y, and Z parameter information is for X, Y and Z positions in the three dimensional representation.

9. The method of claim 6 wherein said separating means comprises a plurality of insulating spacers arranged in an array between the first and second conductive sheets.

10. The method of claim 6 wherein said input means is mounted in front of said computer controlled display.

11. A computer system having a computer controlled display, said computer system comprising:

a user activated input means, the user activated input means having a first conductive sheet having a first terminal and a second terminal, and having a second conductive sheet having a third terminal and a fourth terminal;

a means for separating the first conductive sheet and the second conductive sheet, wherein the input means senses an input with an X parameter information, a Y parameter information, and a Z parameter information when a pressure is applied on a location of the first conductive sheet of the input means, wherein the first sheet contacts the second sheet at the location, wherein the location on the first conductive sheet corresponds to the X parameter information and the Y parameter information of the input to the display system, and wherein the pressure at the location corresponds to the Z parameter information of the input to the display system;

(a) means for applying a predetermined current (I) at the first terminal of the first sheet and means for applying a ground at the third terminal of the second sheet of the input means; and (b) means for measuring first voltage ($v_1$) at the first terminal of the first sheet, a second voltage ($V_2$) at the second terminal of the first sheet, and a third voltage ($V_3$) at the fourth terminal of the second sheet.

12. A computer system as in claim 11 wherein the X, Y, and Z parameter information of the input are obtained from the following equations:

$$X = \frac{V_2}{V_1}, Y = \frac{V_3}{V_1}, Z = \frac{(V_2 - V_3)}{1}.$$

13. A computer system as in claim 11 wherein the input means is mounted in front of said computer controlled display.

14. A computer system as in claim 13 wherein said first sheet and said second sheet are transparent.

15. A computer system as in claim 11 wherein said means for measuring said voltages $V_1$, $V_2$ and $V_3$ measures all said voltages substantially simultaneously.

* * * * *